United States Patent
Jiang

(10) Patent No.: US 9,210,610 B2
(45) Date of Patent: Dec. 8, 2015

(54) METHOD AND APPARATUS FOR HEADER SETTING IN A WIRELESS COMMUNICATIONS SYSTEM

(75) Inventor: Sam Shiaw-Shiang Jiang, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1257 days.

(21) Appl. No.: 11/979,050

(22) Filed: Oct. 30, 2007

(65) Prior Publication Data

US 2008/0101408 A1    May 1, 2008

Related U.S. Application Data

(60) Provisional application No. 60/855,118, filed on Oct. 30, 2006.

(51) Int. Cl.
```
H04W 28/06     (2009.01)
H04L 29/06     (2006.01)
H04L 29/08     (2006.01)
```

(52) U.S. Cl.
CPC .............. *H04W 28/06* (2013.01); *H04L 69/22* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 7,318,187 B2 * | 1/2008 | Vayanos et al. | 714/776 |
| 7,675,941 B2 * | 3/2010 | Kim et al. | 370/473 |
| 2002/0024972 A1 * | 2/2002 | Yi et al. | 370/470 |
| 2002/0048281 A1 * | 4/2002 | Yi et al. | 370/474 |
| 2005/0213605 A1 * | 9/2005 | Kim et al. | 370/466 |

FOREIGN PATENT DOCUMENTS

| | | |
|---|---|---|
| EP | 1 180 878 A2 | 2/2002 |
| JP | 2002-125004 | 4/2002 |

OTHER PUBLICATIONS

R2-062847, "L2 Enhancements for High Data Rates", Ericsson, 3GPP TSG-RAN WG2 #55, Seoul, Korea, Oct. 9-13, 2006.*
RLC LI Optimization for VoIP, 3GPP TSG-RAN WG2 #47 R2-051680, Samsung, May 9, 2005.
User plane protocol enhancements, 3GPP TSG-RAN WG2 Meeting #48bis R2-052508, Ericsson, Oct. 10, 2005.
R2-070764, ASUSTeK : "Enhancing LI for flexible PDU size", 3GPP TSG RAN WG2 #57, XP002512466, Feb. 12-16, 2007.
3GPP TS 25.321 V7.2.0 (Sep. 2006) Medium Access Control (MAC) Protocol Specification (Relase 7).
3GPP TS 25.322 V7.2.0 (Sep. 2006) Radio Link Control (RLC) Protocol Specification (Release 7).
R2-062847, "L2 Enhancements for High Data Rates," Ericsson, 3GPP TSG-RAN WG2 #55, Seoul, Korea, Oct. 9-13, 2006.

* cited by examiner

*Primary Examiner* — Robert C Scheibel
(74) *Attorney, Agent, or Firm* — Blue Capital Law Firm, P.C.

(57) ABSTRACT

A method for setting a header of a protocol data unit in a radio link control layer of a wireless communications system, wherein a length indicator consisting of multiple bits is used to indicate an ending position of a first service data unit carried by a first PDU, includes under a predefined condition, not inserting a length indicator for a second SDU carried by a second PDU in the header of the second PDU.

2 Claims, 4 Drawing Sheets

METHOD AND APPARATUS FOR HEADER SETTING IN A WIRELESS COMMUNICATIONS SYSTEM

CROSS REFERENCE TO RELATED APPLICATIONS

This application claims the benefit of U.S. Provisional Application No. 60/855,118, filed on Oct. 30, 2006 and entitled "Method and apparatus for Segmentation in a wireless communications system", the contents of which are incorporated herein by reference.

BACKGROUND OF THE INVENTION

1. Field of the Invention

The present invention relates to a method and apparatus for header setting in a wireless communications system, and more particularly to a method and apparatus for decreasing header length of radio link control protocol data units.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

The access stratum of the 3G mobile telecommunications system comprises a radio resource control (RRC), radio link control (RLC), media access control (MAC), packet data convergence protocol (PDCP), broadcast/multicast control (BMC) and other sub-layers of different functions. The operations of the above-mentioned sub-layers are well known for those skilled in the art, and will not be further mentioned. A primary function of the RLC layer is providing different transmission quality processing, performing segmentation, reassembly, concatenation, padding, retransmission, sequence check, and duplication detection on transmitted data or control instructions based on different transmission quality requirements. The MAC layer can match packets received from different logic channels of the RLC layer to common, shared, or dedicated transport channels according to radio resource allocation commands of the RRC layer, for performing channel mapping, multiplexing, transport format selection, or random access control.

In the RLC layer, the purpose of "padding" is to make lengths of all Protocol Data Units (PDUs) outputted from an RLC entity to be the same. That is, after the RLC entity receives a Service Data Unit (SDU) from the upper layer, if the length of the SDU is smaller than a maximum PDU payload size, the RLC entity will pad out the SDU with meaningless data, so as to form a PDU in conformation with a predefined length. Otherwise, if the length of the SDU is greater than the maximum PDU payload size, the RLC entity will segment the SDU with the maximum PDU payload size. After the segmentation, if the length of the last segment is smaller than the maximum PDU payload size, the RLC entity will pad out the last segment with meaningless data, to form a PDU in conformation with the predefined length.

In the prior art, "padding" can make the lengths of the RLC PDUs to be identical to each other. However, the prior art "padding" decreases bandwidth utility rate and data processing efficiency, especially for high data rate applications, such as High Speed Downlink Package Access (HSDPA) and High Speed Uplink Package Access (HSUPA) in the 3G mobile telecommunications system. In such a situation, a scheme of variable RLC PDU size is proposed to eliminate padding, to enhance bandwidth utility rate and data processing efficiency, and to improve uplink and downlink (UL/DL) transmission rate.

For example, please refer to FIG. 1, which illustrates a schematic diagram of an application of the variable RLC PDU size according to the prior art. In FIG. 1, SDU_1 and SDU_2 represent SDUs from the upper layer, PDU_1~PDU_3 represent RLC PDUs, oblique-line parts in front of PDU_1~PDU_3 represent PDU headers, and MPZ represents the maximum PDU payload size. As shown in FIG. 1, the total length of SDU_1 and SDU_2 is greater than two times MPZ, but smaller than three times MPZ. Therefore, the prior art uses a "Blind Cut" method to carry SDU_1 and SDU_2 with PDU_1~PDU_3. The Blind Cut method means that if the length of one or concatenated SDUs is greater than one or multiple times of MPZ, the RLC entity will segment the SDU with a unit of MPZ until a last segment or SDU smaller than MPZ is left, and carry the last segment or SDU with a variable-size RLC PDU. In other words, the lengths of PDU_1 and PDU_2 are equal to the maximum PDU size, such as 42 bytes, while the length of PDU_3 is smaller than the maximum PDU size, such as 29 bytes.

In the prior art, a Length Indicator (LI) field, 7-bit or 15-bit, is needed in the RLC PDU to indicate an ending position of an SDU. Following the LI field, there is an Extension bit (E) field indicating that the next field is LI or data field. Under the condition that "padding" is unnecessary, the LI field may become redundant, thus increase the length of the PDU header, and affect transmission efficiency.

SUMMARY OF THE INVENTION

According to the present invention, a method for setting a header of a protocol data unit, called PDU hereinafter, in a radio link control layer of a wireless communications system, wherein a length indicator consisting of multiple bits is used to indicate an ending position of a first service data unit, called SDU hereinafter, carried by a first PDU, is disclosed. The method comprises under a predefined condition, not inserting a length indicator for a second SDU carried by a second PDU in the header of the second PDU.

According to the present invention, a communications device of a wireless communications system utilized for setting a header of a protocol data unit, called PDU hereinafter, in a radio link control layer, for decreasing the header length, wherein a length indicator consisting of multiple bits is used to indicate an ending position of a first service data unit, called SDU hereinafter, carried by a first PDU, is disclosed. The communications device comprises a control circuit for realizing functions of the communications device, a processor installed in the control circuit for executing a program code to operate the control circuit, and a memory coupled to the processor for storing the program code. The program code comprises under a predefined condition, not inserting a length indicator for a second SDU carried by a second PDU in the header of the second PDU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
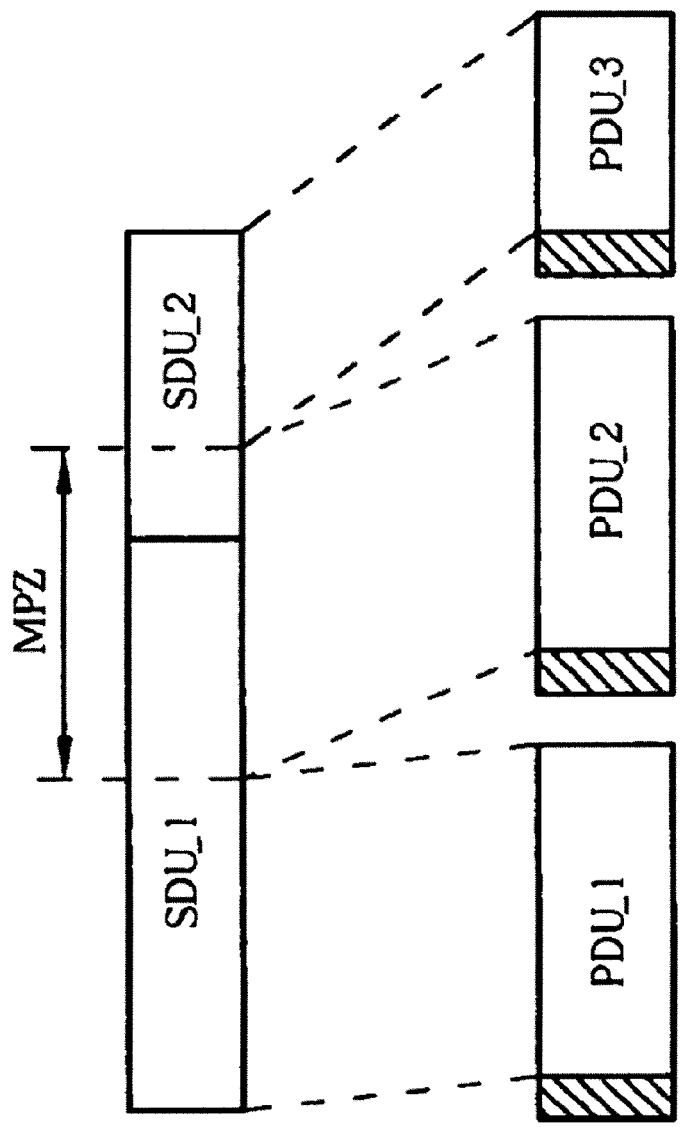
FIG. 1 is a schematic diagram of an application of the variable RLC PDU size according to the prior art.
Figure 2:
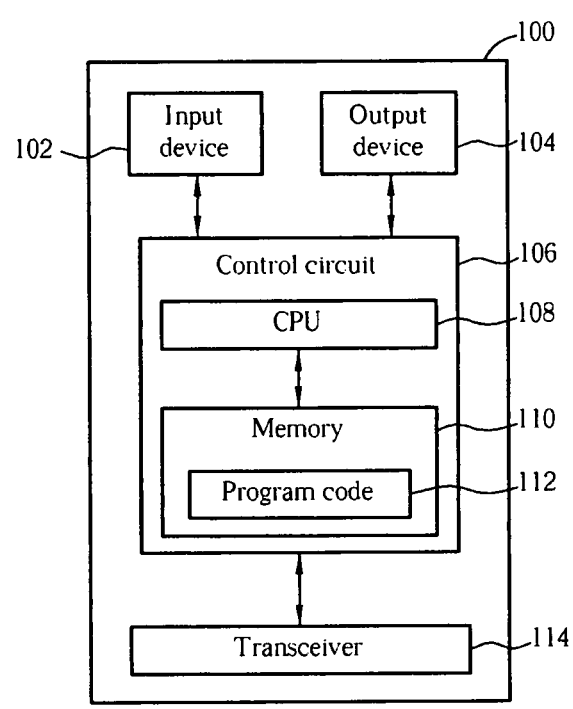
FIG. 2 is a function block diagram of a wireless communications device.

Please refer to FIG. 2, which is a functional block diagram of a communications device 100. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 3:
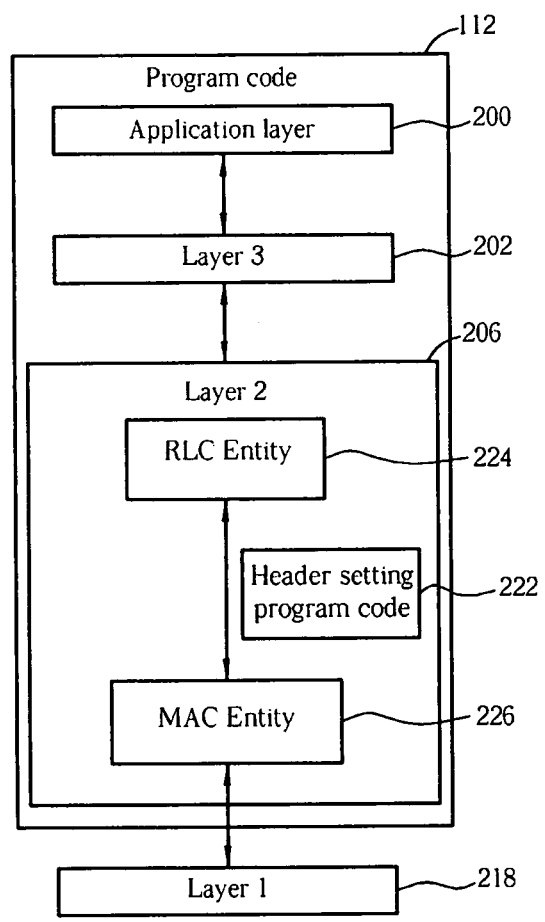
FIG. 3 is a diagram of program code of FIG. 1.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Targeting at high data rate applications, such as HSDPA and HSUPA in the 3G mobile communications system, the RLC entity 224 can use variable-size RLC PDU to eliminate "padding", and enhance bandwidth utility rate, data processing efficiency, and UL/DL transmission rate. In such a situation, the embodiment of the present invention provides a header setting program code 222 in the Layer 2 206, for setting headers of RLC PDUs, and decreasing the bit numbers of the headers.

Figure 4:
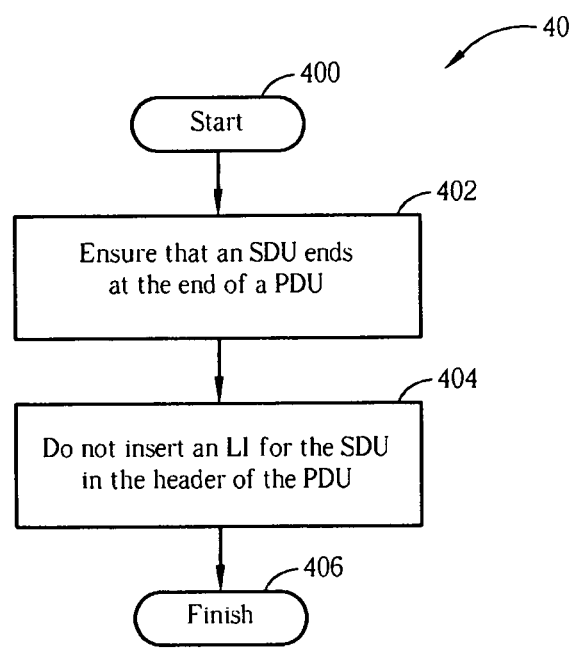
FIG. 4 is a flowchart of a process according to an embodiment of the present invention.

In general, a length indicator consisting of multiple bits is used to indicate an ending position of an SDU carried by a PDU. When an SDU ends at the end of an RLC PDU, the LI indicating an ending position of the SDU in the RLC PDU can be removed. In such a situation, the embodiment of the present invention provides a process 40 as shown in FIG. 4, for setting a header of a PDU in an RLC layer of a wireless communications system, so as to decrease the header length of the PDU. The process 40 can be compiled in the header setting program code 222, and comprises the following steps:

Step 400: Start.
Step 402: Ensure that an SDU ends at the end of a PDU.
Step 404: Do not insert an LI for the SDU in the header of the PDU.
Step 406: Finish.

Therefore, according to the process 40, when the last SDU carried by the PDU ends at the ending position of the PDU, the embodiment of the present invention does not insert LI for the last SDU. As a result, the header length of the PDU can be decreased. Preferably, the step 402 can be achieved when the length of the PDU is smaller than the maximum PDU size, or when a single bit indicates that an SDU ends at the ending position of the PDU.

In summary, the embodiment of the present invention can decrease the bit number of the RLC PDU header, and thus enhance transmission efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for setting a header of a protocol data unit (PDU) carrying at least a last segment of a service data unit (SDU) in a radio link control layer of a wireless communications system, the method comprising:
   forming a SDU;
   forming a PDU to carry at least a last segment of the SDU, wherein the PDU includes a header, in which a length indicator of multiple bits indicating an ending position of the SDU is inserted when a length of the PDU is equal to a predefined maximum PDU length and the length indicator is not inserted when the length of the PDU is smaller than the predefined maximum PDU length; wherein the length indicator is not inserted in a header of any other PDU when the length of the PDU is smaller than the predefined maximum PDU length;
   enabling a decrease of a length of the header of the PDU by not inserting the length indicator in the header; and
   transmitting the PDU to a peer receiver.

2. A communications device of a wireless communications system utilized for setting a header of a protocol data unit (PDU) in a radio link control layer, for decreasing the header length, the communications device comprising:
   a control circuit for realizing functions of the communications device;
   a processor installed in the control circuit for executing a program code to operate the control circuit; and
   a memory coupled to the processor for storing the program code;
   wherein the program code comprises:
      forming a SDU;
      forming a PDU to carry at least a last segment of the SDU, wherein the PDU includes a header, in which a length indicator of multiple bits indicating an ending position of the SDU is inserted when a length of the PDU is equal to a predefined maximum PDU length and the length indicator is not inserted when the length of the PDU is smaller than the predefined maximum PDU length; wherein the length indicator is not inserted in a header of any other PDU when the length of the PDU is smaller than the predefined maximum PDU length;
      enabling a decrease of a length of the header of the PDU by not inserting the length indicator in the header; and
      transmitting the PDU to a peer receiver.

* * * * *